United States Patent
Lane et al.

(10) Patent No.: US 10,862,865 B2
(45) Date of Patent: Dec. 8, 2020

(54) SMALL SATELLITE DEVICE AND SYSTEM PROTECTED AGAINST CYBER-ATTACKS AND METHOD FOR PROTECTING THE SAME

(71) Applicant: United States of America as represented by the Secretary of the Navy, San Diego, CA (US)

(72) Inventors: Daria Christine Lane, San Diego, CA (US); Enrique Salvador Leon, San Diego, CA (US); Francisco Chiu Tacliad, III, San Diego, CA (US); Dmitriy Ivanovich Obukhov, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 251 days.

(21) Appl. No.: 16/015,012

(22) Filed: Jun. 21, 2018

(65) Prior Publication Data

US 2019/0394166 A1     Dec. 26, 2019

(51) Int. Cl.
*H04L 29/06*     (2006.01)
*H04L 29/02*     (2006.01)
(Continued)

(52) U.S. Cl.
CPC ...... *H04L 63/0245* (2013.01); *H04L 63/1408* (2013.01); *B64C 39/024* (2013.01); *B64D 45/0015* (2013.01); *H04L 29/02* (2013.01); *H04L 29/06068* (2013.01); *H04L 63/02* (2013.01)

(58) Field of Classification Search
CPC . H04L 63/0245; H04L 63/1408; H04L 63/02; H04L 29/02; H04L 29/06068; B94C 2201/00
See application file for complete search history.

(56) References Cited

U.S. PATENT DOCUMENTS

| 7,437,613 | B2 | 10/2008 | Baumberger |
| 7,805,533 | B2 | 9/2010 | Burns et al. |

(Continued)

FOREIGN PATENT DOCUMENTS

WO    WO-2019123447 A1 *  6/2019    ......... H04L 63/1425

OTHER PUBLICATIONS

Lane et al., "High-Assurance Cyber Space Systems for Small Satellite Mission integrity", 31st Annual Conference on Small Satellites, Aug. 2017.

(Continued)

*Primary Examiner* — Daniel B Potratz
*Assistant Examiner* — Wansik You
(74) *Attorney, Agent, or Firm* — Naval Information Warfare Center Pacific; Kyle Eppele; J. Eric Anderson

(57) ABSTRACT

An unmanned autonomous device includes an isolation kernel having plurality of drivers respectively dedicated to a plurality of subsystems. The drivers are configured to facilitate communication between the subsystems. A gateway in the unmanned autonomous device is configured to control routing of data between the subsystems via the drivers respectively dedicated to the subsystems, such that data is only allowed to be passed between the subsystems along predefined routes.

10 Claims, 3 Drawing Sheets

(51) Int. Cl.
*B64C 39/02* (2006.01)
*B64D 45/00* (2006.01)

(56) References Cited

U.S. PATENT DOCUMENTS

| | | | |
|---|---|---|---|
| 2014/0208442 A1 | 7/2014 | Mooring | |
| 2014/0324219 A1* | 10/2014 | Dumora | B25J 9/1679 |
| | | | 700/258 |
| 2015/0051755 A1* | 2/2015 | Erhart | G05D 1/0011 |
| | | | 701/2 |
| 2015/0150073 A1* | 5/2015 | Bhalerao | H04L 63/105 |
| | | | 726/1 |
| 2015/0256247 A1* | 9/2015 | Haley | H04B 7/18504 |
| | | | 455/12.1 |
| 2015/0308930 A1* | 10/2015 | Berger | G01N 1/2252 |
| | | | 73/28.04 |
| 2016/0190820 A1* | 6/2016 | Chae | B60L 58/14 |
| | | | 320/134 |

OTHER PUBLICATIONS

Mercado et al., "Cyber-Security, Aerospace, and Secure Satellite Communications—Evolving our Approach", ASEE's 123rd Annual Conference and Exposition, Paper ID #16640, Jun. 2016.

\* cited by examiner

SMALL SATELLITE DEVICE AND SYSTEM PROTECTED AGAINST CYBER-ATTACKS AND METHOD FOR PROTECTING THE SAME

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 106686.

FIELD OF THE INVENTION

The present disclosure pertains generally to providing protection against cyber-attacks. More particularly, the present disclosure pertains to providing protection against cyber-attacks in a small satellite.

BACKGROUND OF THE INVENTION

Unmanned autonomous devices, such as unmanned aerial vehicles (UAVs), unmanned underwater vehicles (UUVs), and small satellites, are gaining popularity in the civil and military sectors. In particular, the use of small satellite technology for space related missions has been gaining popularity within the space community. Small satellites are relatively inexpensive and easy to deploy.

Cybersecurity is often neglected during development of small satellites. Cybersecurity threats present a systemic challenge to modern space missions, where networked embedded systems are highly susceptible to cyber-attacks. Researchers and hackers have shown that embedded systems, such as those deployed in small satellite architectures, are vulnerable to remote attacks that can cause physical damage to the system and ultimately compromise mission integrity.

Hardware presents several vulnerabilities to cyber-attacks. This is partly because many of the components for small satellites are externally sourced. During fabrication, these components can be maliciously modified. A hardware component infected with malicious software could spread to other components or modify the intended behavior of the system.

Physical sensors and ports are other potential hardware vulnerabilities. False-data-injection (FDI) attacks, either by hacking of the physical sensor device or tampering with sensor data, can trigger incorrect control actions. Furthermore, an adversary can hijack command and control by injecting a Trojan or malware via an open physical port or interface.

Software also presents vulnerabilities to cyber-attacks. Unsecure code, lack of authentication, unencrypted traffic, and poor protocol implementation are a few examples of potential software vulnerabilities. Human coding errors from poor coding practices, insufficient unit test coverage, legacy code, or code that originates from an untrusted source may contain bugs or undefined behavior that could be exploited resulting in code injection, remote code execution, or denial of service (DoS).

Ground stations may also present vulnerabilities to cyber-attacks. Ground stations are often networked to accommodate a variety of missions and users, making them more prone to network-based attacks such as replay, packet injection, session hijacking or eavesdropping. An adversary may also be able to exploit software vulnerabilities in poor network stack implementations and weak cryptography. Small satellite subsystems are often built to operate over a universal asynchronous receiver/transmitter (UART) protocol or an inter-integrated circuit (I2C) protocol, while some operate over User Diagram Protocol/Internet Protocol (UDP/IP). Such implementations are designed to work with specific inputs but should be robust enough to gracefully handle malformed data. Faults that can be triggered by input sent by a user will correspond to a bug in the implementation of the application. Ultimately, this bug may result in an exploitable feature within the software code.

Existing small satellite system architectures are not designed to be cyber-secure. Thus, there is a need for a technique for protecting a small satellite device against cyber-attacks.

SUMMARY OF THE INVENTION

According to an illustrative embodiment, an unmanned autonomous device includes an isolation kernel having a plurality of drivers respectively dedicated to a plurality of subsystems. The drivers are configured to facilitate communication between the subsystems. A gateway in the unmanned autonomous device is configured to control routing of data between the subsystems via the drivers respectively dedicated to the subsystems, such that data is only allowed to be passed between the subsystems along pre-defined routes.

These, as well as other objects, features and benefits will now become clear from a review of the following detailed description, the illustrative embodiments, and the accompanying drawings.

BRIEF DESCRIPTION OF THE DRAWINGS

Features of illustrative embodiments will be best understood from the accompanying drawings, taken in conjunction with the accompanying description, in which similarly-referenced characters refer to similarly-referenced parts, and in which.

DETAILED DESCRIPTION OF THE EMBODIMENTS

According to illustrative embodiments, an unmanned autonomous device, such as a small satellite, includes an isolation kernel that isolates subsystems, such that data cannot be directly forwarded from one subsystem to another. Instead, the data is forwarded for route verification, format verification, and context verification based on state dependent rules. In this manner, the device is protected against cyber-attacks.

In the description that follows, a small satellite is referred to as an example of an unmanned autonomous device. However, it should be appreciated that the methods and systems described herein may applicable to other unmanned autonomous devices, including but not limited to UAVs and UUVs.

Figure 1:
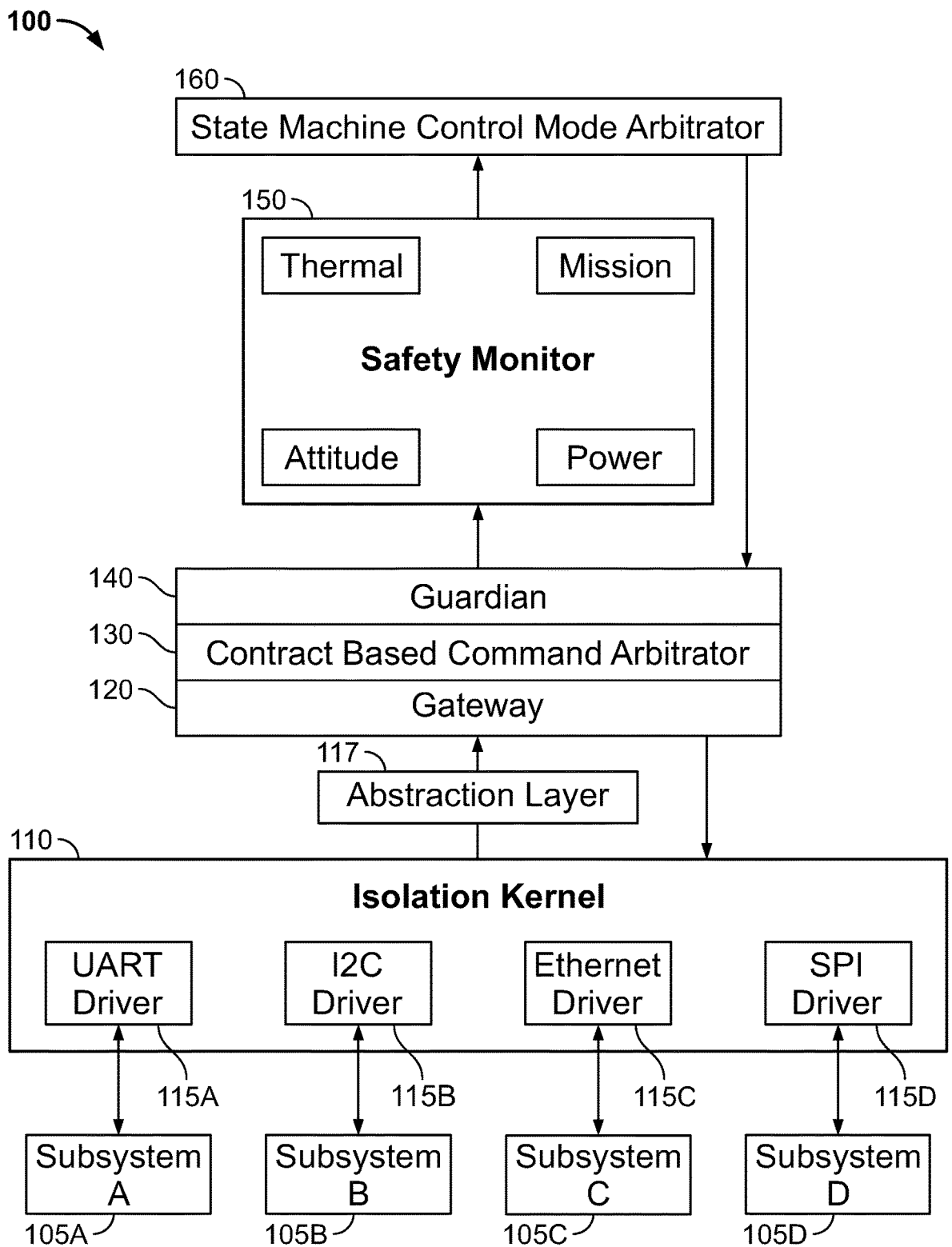
FIG. 1 illustrates a small satellite system with protection against cyber-attacks according to an illustrative embodiment.

Referring to FIG. 1, a small satellite system 100 includes an isolation kernel 110, a gateway 120, a contract based command arbitrator 130, a guardian 140, a safety monitor 150, and a state machine control mode arbitrator 160.

The isolation kernel 110 includes dedicated drivers 115A, 115B, 115C and 115D that are in respective communication with the subsystems 105A, 105B, 105C, and 105D. The isolation kernel 110, gateway 120, contract based command arbitrator 130, and guardian 140 are part of a "secure gateway system" that receives data from the subsystems 105A, 105B, 105C, and 105D and forwards data to the subsystems as appropriate. The data may include, for example, commands, messages and telemetry data. The safety monitor 150 and the state machine control mode arbitrator 160 may be considered to be part of a "brain" of the small satellite system 100, handling flight control functions, monitoring the state of the small satellite system 100, and informing the contract based command arbitrator 130 and the guardian 140 of state changes, as described in further detail below.

The subsystems 105A, 105B, 105C, and 105D may include any typical satellite subsystem, for example, an attitude determination and control system (ADCS), an electrical power system (EPS), a battery, a communication system (such as a radio), motors, a propulsion system, and guest payload (such as a temperature sensor, a camera, etc.). It should be appreciated that a flight control command and data handling subsystem may also be included.

In the small satellite system 100 shown in FIG. 1, the driver 115A is a universal asynchronous receiver/transmitter (UART) driver which may be used to communicate with an electric power system (EPS) using a UART protocol as an interface protocol. The driver 115B is an inter-integrated circuit (I2C) driver which may be used to communicate with an ADCS subsystem using an I2O protocol as an interface protocol. The driver 115C is an Ethernet driver which may be used to communicate with guest payloads using an Ethernet protocol as an interface protocol. The driver 115D is a Serial Peripheral Interface (SPI) driver which may also be used to communicate with guest payloads using an SPI protocol as an interface protocol. It should be appreciated that these drivers are provided by way of example, and that other types of drivers, such as a Controller Area Network (CAN) driver, may be used to communicate with these and other subsystems.

The isolation kernel 110 provides isolation between the subsystems 105A, 105B, 105C, and 105D by using the drivers 115A, 115B, 115C and 115D that are respectively dedicated to the subsystems. Isolation of the subsystems 105A, 105B, 105C, and 105D reduces a potential attack profile to a single subsystem.

As noted above, the subsystems may use different interface protocols for communication, such as the UART protocol, the I2C protocol, the Ethernet protocol, and the SPI protocol. However, an abstraction layer 117 is configured to abstract the interface protocols used by each subsystem into a common space packet protocol, such as the Consultative Committee for Space Data Systems (CCSDS) protocol. That is, the data received from the subsystems 105A, 105B, 105C, and 105D via the drivers 115A, 115B, 115C, and 115D, respectively, is formatted in a manner consistent with the common space packet protocol. For example, the data packets received from the subsystems are formatted such that each data packet includes a number of bytes defined by the common space packet protocol. The abstraction layer 117 extracts the data received from the drivers 115A, 115B, 115C, and 115D in the common space protocol format and relays the extracted data to the gateway 120 in the common space packet protocol. Having the abstraction layer 117 abstract the interface protocols into a common space packet protocol reduces the complexity of software development.

Data received from one of the subsystems 105A, 105B, 105C, or 105D, i.e., a source subsystem, that is intended for another subsystem, i.e., a destination subsystem, is not automatically routed from the source subsystem to the destination subsystem. Rather, the received data is forwarded by the isolation kernel 110 to the gateway 120. The received data may include, for example, messages and/or commands.

The gateway 120 only allows data to be passed between subsystems for which there are predefined routes. For example, routes may be predefined for passing data between an ADCS subsystem and guest payload subsystems. However, due to risk of intrusion into a communication subsystem by a third party, there may not be a predefined route between a communication subsystem and the ADCS subsystem. The gateway 120 may determine whether a route is predefined by querying a route database storing predefined routes between subsystems. If there is not a predefined route between the source subsystem and the destination subsystem, the gateway 120 prevents the received data from being passed to the destination subsystem.

If there is a predefined route for passing a received message from a source subsystem to a destination subsystem, the received data is passed from the gateway 120 to a contract based command arbitrator 130 which determines whether the received data is in an allowed format. An allowed format may be predefined, for example, in terms of the length of a data packet and/or a data packet header structure. One or more allowed formats may be stored in a database. Thus, the contract based command arbitrator 130 determines whether the received data is an allowed format by analyzing the length and the header of a data packet and determining whether the length and the header comply with a predefined allowed format. Additionally, the contract based command arbitrator 130 may perform a checksum to verify the integrity of the received data. If the received data is not in an allowed format and/or the integrity of the received data is not verified, the contract based command arbitrator 130 prevents the received data from the source subsystem from being passed to the destination subsystem.

If the contract based command arbitrator 130 determines that the received data is an allowed format, the contract based command arbitrator 130 determines whether data from the source subsystem is allowed to be passed to the destination subsystem based on communication contracts that define which subsystems are allowed to pass data to each other. This determination is made by consulting a database of communication contracts. For example, a communication contract may be predefined that indicates that an ADCS subsystem is allowed to receive data from guest payload subsystems. However, due to risk of intrusion into a communication subsystem by a third party, there may not be a predefined communication contract that indicates that the ADCS subsystem is allowed to receive data from a given communication subsystem. The communication contracts may be altered as the state of the small satellite system 100 changes as described in further detail below.

If the contract based command arbitrator 130 determines that a communication contract is defined for allowing data to be passed from the source subsystem to the destination subsystem, the received data is passed to the guardian 140 which determines whether the content of the received data is authorized, i.e., whether the content corresponds to content of an authorized process. The guardian 140 accomplishes this by comparing the content of the received data with types of authorized content contained in an authorized content database. Authorized content may include, for example, commands to perform various actions. An example of authorized content may include a command from a command and data handling subsystem to change the orientation of the small satellite system 100. An example of unauthorized content may include a command from a radio subsystem to change the orientation of the small satellite system 100. The types of authorized content are defined by guardian rules, which may be altered depending on the state of the small satellite system 100, as described in further detail below. If the content of the received data is not authorized, the guardian 140 prevents the received data from the source subsystem from being passed to the destination subsystem.

Through the use of the isolation kernel 110, subsystems 105A, 105B, 105C, and 105D are not allowed to directly communicate with each other. Also, the gateway 120, the contract based command arbitrator 130, and the guardian 140 only allow data to be passed between subsystems if there is a predefined route, if the data is in an allowed format, and if the content of the data is authorized. Thus, even if an intruder is able to hack into one of the subsystems 105A, 105B, 105C or 105D, that subsystem would not be able to directly communicate with another subsystem and compromise the satellite mission.

For example, assume an intruder is able to hack into a radio subsystem via a radio link, e.g., from a compromised ground station. The intruder may try to have the radio subsystem send a message to the ADCS subsystem to change the orientation of the satellite. In this scenario, a dedicated driver in the isolation kernel 110 would receive the message. Instead of forwarding the message to the driver dedicated to the ADCS subsystem, the message would be forwarded to the gateway 120, contract based command arbitrator 130, and guardian 140, as appropriate, to determine whether the message should be passed to the ADCS subsystem.

In particular, the gateway 120 would determine whether there is a predefined route between the radio subsystem and the ADCS subsystem. As indicated above, to prevent intrusion by a third party, there may not be a predefined route between the radio subsystem and the ADCS subsystems. Thus, the gateway 120 would prevent the message from being passed to the ADCS subsystem. Assuming, for illustrative purposes, that there is a predefined route between the radio subsystem and the ADCS subsystem, the contract based command arbitrator 130 would determine whether the message is in an allowed format and whether a communication contract is predefined that indicates that messages are allowed to be passed from the radio subsystem to the ADCS subsystem. As indicated above, due to the risk of intrusion into a radio subsystem by a third party, there may not be a predefined communication contract that indicates that the ADCS subsystem is allowed to receive data from a radio subsystem. Thus, the contract based command arbitrator 130 would prevent the message from being passed to the ADCS subsystem. Assuming, for illustrative purposes, that the received message is in an allowed format and there is a predefined communication contract allowing the ADCS subsystem to received data from the radio subsystem, the guardian 140 would determine whether the content of the message is safe. As indicated above, a command from a radio subsystem instructing an ADCS subsystem to change orientation would not be considered safe content. Thus, the guardian 140 would prevent the message from being passed to the ADCS subsystem.

According to an illustrative embodiment, the state of the small satellite system 100 is also taken into account in determining whether to pass data between subsystems. The state of the small satellite system 100 is continuously verified by a safety monitor 150. The safety monitor 150 monitors the thermal state, mission state, attitude state and power state of the small satellite system 100. The safety monitor 140 determines whether safety is compromised by comparing the thermal state, mission state, attitude state, and power state to predefined thresholds. If one or more of the thermal state, the mission state, the attitude state, and the power state of the small satellite system 100 indicates that safety is compromised, e.g., because one or more of the thermal state, the mission state, the attitude state, and the power state fall below respective predefined thresholds, the safety monitor 150 places the small satellite system 100 into a minimal safe mode until recovery is possible. During the minimal safe mode, the small satellite system 100 is restricted to operating within a particular safe temperature range (not too hot, not too cold) in a low power non-mission mode, with attitude changes restricted.

The safety monitor 150 also provides the state of small satellite system 100 to the state machine control mode arbitrator 160. The state of the small satellite system 100 may change based on incoming data from the subsystems 105A, 105B, 105C, and 105D. The state machine control mode arbitrator 160 is configured to send commands to the guardian 140 and/or the contract based command arbitrator 130 to alter the communication contracts and/or the guardian rules as the state of the small satellite system 100 changes, to maintain safety. In this manner, the state machine control mode arbitrator 160 determines whether received data from a source subsystem is safe to be passed to a destination subsystem based on the current state of the small satellite system 100 and allows or prevents the data from being passed, as appropriate.

For example, consider a command that is received via a radio subsystem to be passed to a camera subsystem, indicating that the camera should be turned on. However, the power state indicates that the small satellite system 100 is operating on low power. In this case the state machine control mode arbitrator 160 may prevent the command from being passed to the camera subsystem to preserve power. This may be accomplished by the state machine control mode arbitrator 160 commanding the guardian 140 to alter the guardian rules, as appropriate, such that data including instructions to operate the small satellite system 100 in any mode other than "low power mode" would not be authorized by the guardian 140. If, on the other hand, the power state indicates that the small satellite system 100 is operating on normal power, the guardian rules would not be altered, and the command would be allowed to pass to the camera subsystem as long as it complies with the "normal power mode" guardian rules.

Although not shown, the small satellite system 100 may include additional components, such as an emergency mode controller, legacy control software, etc. The legacy control software can initially be implemented in an unsecure, isolated virtual machine environment. Portions of the legacy control software may be ported over to the isolation kernel 110 as they become verified. Legacy control software that is incompatible with the isolation kernel 110 may remain in the virtual machine environment.

According to illustrative embodiments, various components of the system shown in FIG. 1 may be implemented by one or more computing devices, such as that illustrated in FIG. 3 as described below. According to one embodiment, the safety monitor 150 and the state machine control mode arbitrator 160 may reside on the same hardware, i.e., be included in the same computing device, as the gateway 120, the contract based command arbitrator 130, and the guardian 140.

According to another embodiment, the safety monitor 150 and the state machine control mode arbitrator 160 may reside on separate hardware than the gateway 120, the contract based command arbitrator 130, and the guardian 140. In this embodiment, the state machine control mode arbitrator 160 would retain the highest privileges to the communication contracts in the contract based command arbitrator 130 and the guardian rules in the guardian 140.

Figure 2:
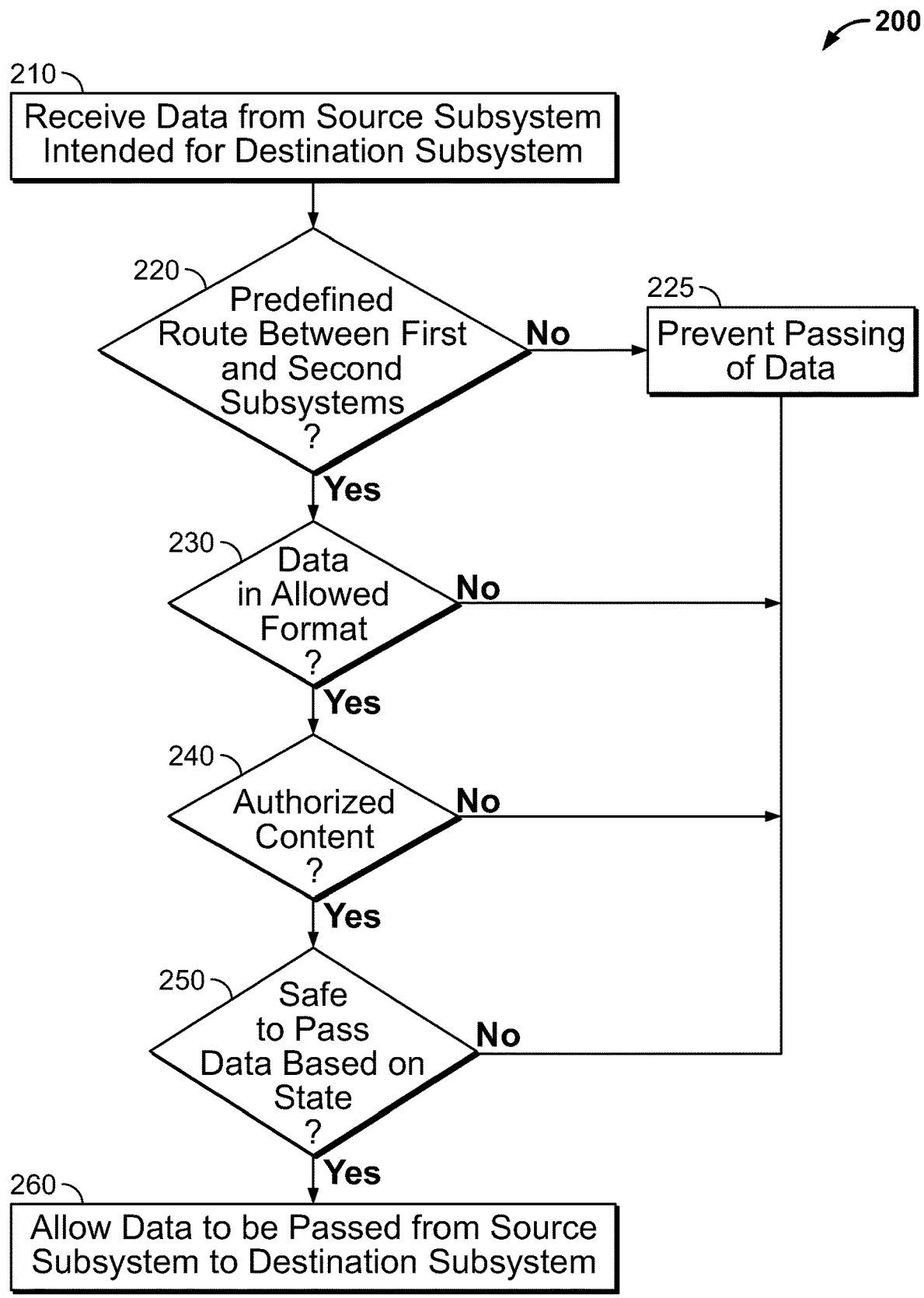
FIG. 2 is a flow chart showing steps in a process for protecting a small satellite against cyber-attacks according to illustrative embodiments.

FIG. 2 is a flow chart showing steps in a process for protecting a small satellite against cyber-attacks according to illustrative embodiments. Referring to FIG. 2, the process 200 begins at step 210 at which data is received from a source subsystem, such as one of the subsystems 105A, 105B, 105C or 105D shown in FIG. 1. The data is received via a source driver in a kernel that is dedicated to the source subsystem, such as the UART driver 115A shown in FIG. 1. The data is intended to be routed to a destination subsystem, such as another of the subsystems 105A, 105B, 105C, or 105D shown in FIG. 1. The source driver dedicated to the source subsystem, such as the UART driver 115A shown in FIG. 1, is isolated from the destination driver dedicated to the destination subsystem, such as the I2C driver 115b shown in FIG. 1.

At step 220, a determination is made by a gateway, such as the gateway 120 shown in FIG. 1, whether a route is predefined between the source subsystem and the destination subsystem. This determination may be made by querying a database for a list of predefined routes between the subsystems. If there is no predefined route between the source subsystem and the destination subsystem, the process proceeds to step 225, and the data is prevented from being passed from the source subsystem to the destination subsystem by the gateway.

If, at step 220, it is determined that a route is predefined between the source subsystems to the destination subsystem, the process proceeds to step 230. At step 230, a determination is made by a command arbitrator, such as the contract based command arbitrator 130 shown in FIG. 1, whether the data received from the source subsystem via the driver is an allowed format. This determination may be made by analyzing a length and a header structure of a received data packet to determine whether the length and header structure comply with a predefined allowed format. If the data is not in the allowed format, the process proceeds to step 225, and the data is prevented from being passed from the source subsystem to the destination subsystem by the command arbitrator.

If, at step 230, it is determined that the data is in an allowed format, the process proceeds to step 240. At step 240, a guardian, such as the guardian 140 shown in FIG. 1, determines whether the content of the data is authorized content. This determination may be made by comparing the content with types of authorized content contained in a database. If it is determined that content is not authorized, the process proceeds to step 225, and the data is prevented from being passed from the source subsystem to the destination subsystem by the guardian.

If it is determined, at step 240, that the content is authorized, the process proceeds to step 250 at which step a state machine control mode arbitrator, such as the state machine control mode arbitrator 160 shown in FIG. 1, determines whether the data is safe to be passed between the subsystems based on the state of the small satellite. The state machine control mode arbitrator receives state information from a safety monitor, e.g., the safety monitor 150, which continuously monitors the state of the small satellite.

If, at step 250, it is determined that the data is not safe to be passed, the process proceeds to step 225, and the data is prevented from being passed between the source subsystem and the destination subsystem, e.g., by the state machine control mode arbitrator instructing the guardian to alter the guardian rules, such that the data is prevented from being passed. If at step 250, it is determined that the data is safe to be passed, the data that is authorized by the guardian is allowed be passed between the source subsystem and destination subsystem along the predefined route at step 260.

It should be appreciated that the steps and order of steps described and illustrated are provided as examples. Fewer, additional, or alternative steps may also be involved in the process, and/or some steps may occur in a different order. For example, it should be appreciated that the process may include a step for determining whether a communication contract is predefined that indicates that data is allowed to be passed from the source subsystem and the destination subsystem. This step may be included, for example, in between steps 230 and 240. If there is no predefined communication contract, data would be prevented from being passed from the source subsystem to the destination subsystem at step 225. If there is a predefined communication contract, the process would then proceed to step 240.

Figure 3:
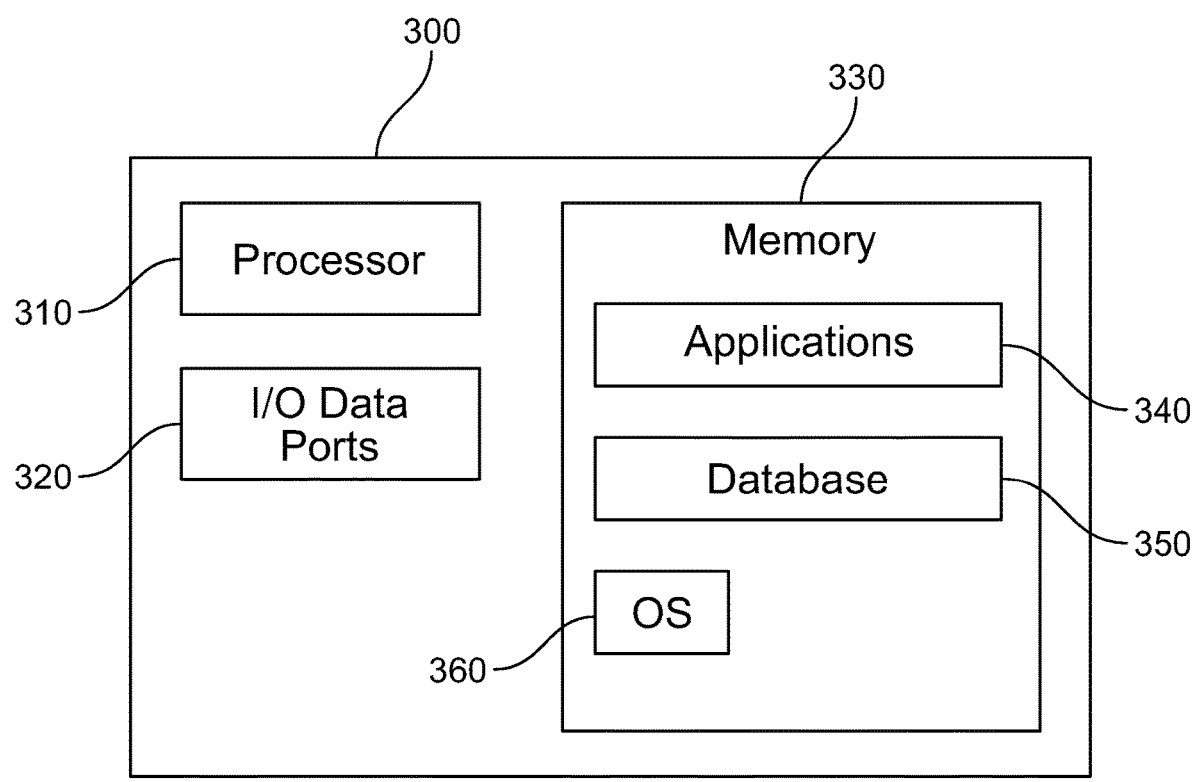
FIG. 3 illustrates a computing device for use in a small satellite to provide protection against cyber-attacks according to an illustrative embodiment.

FIG. 3 is a block diagram of a computing device which may be used for protecting a small satellite against cyber-attacks according to illustrative embodiments. Although no connections are shown between the components illustrated in FIG. 3, those skilled in the art will appreciate that the components can interact with each other via any suitable connections to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 3, the computing device 300 includes a processor 310 that receives inputs and transmits outputs via I/O Data Ports 320. The I/O Data Ports 320 can be implemented with any suitable interface through which data may be received and transmitted wired and/or wirelessly from and to, e.g., the subsystems 105A, 105B, 105C, and 105D shown in FIG. 1.

Although not shown, the computing device 300 may also include a physical hard drive. The processor 310 communicates with the memory 330 and the hard drive via, e.g., an address/data bus (not shown). The processor 310 can be any commercially available or custom microprocessor. The memory 330 is representative of the overall hierarchy of memory devices containing the software and data used to implement the functionality of the device 300. The memory 330 can include, but is not limited to the types of memory devices described above. As shown in FIG. 3, the memory 330 may include several categories of software and data used in the device 300, including applications 340, a database 350, an operating system (OS) 360, etc.

The applications 340 can be stored in the memory 330 and/or in a firmware (not shown) as executable instructions, and can be executed by the processor 310.

The applications 340 include various programs that implement the various features of the device 300. For example, the applications 340 may include applications to implement the functions of the abstraction layer 117, the gateway 120, the contract based command arbitrator 130, the guardian 140, the safety monitor 150 and the state machine control mode arbitrator 160 shown in FIG. 1.

The OS 360 includes a kernel, such as the isolation kernel 110 shown in FIG. 1. The OS 360 manages the operations of the computing device, including handling the memory 330 and handling execution of the applications 340 by the processor 310.

The database 350 represents the static and dynamic data used by the applications 340, the OS 360, and other software programs that may reside in the memory. The database 350 may be used to store various data including data needed to execute the applications 340. For example, the database 350 may store, e.g., predetermined routes between subsystems, lists of allowed formats for data to be passed between subsystems, types of authorized context for data to be passed between subsystems, satellite state data, etc.

While the memory 330 is illustrated as residing proximate the processor 310, it should be understood that at least a portion of the memory 330 can be a remotely accessed storage system.

It should be understood that FIG. 3 and description above are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer readable instructions.

Further, although the computing device 300 shown in FIG. 3 includes applications for executing the tasks of the abstraction layer 117, the gateway 120, the contract based command arbitrator 130, the guardian 140, the safety monitor 150 and the state machine control mode arbitrator 160, it should be appreciated some or all of these components may be implemented separately in one or more interface boards that are accessible by the computing device.

In addition, it should be appreciated that some of the subsystems, such as the ADCS, may include computing devices similar to that shown in FIG. 3.

According to the illustrative embodiments described herein, security for a small satellite and other types of unmanned autonomous devices is provided such that incoming data is monitored, authorized, and verified based on state-dependent rules. Further, security between subsystems is ensured by isolation of the subsystems.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. An unmanned autonomous device, comprising:
a plurality of physical subsystems;
a plurality of drivers respectively and communicatively coupled to different physical subsystems to form a plurality of subsystem-driver combinations, wherein each subsystem-driver combination communicates via a different interface protocol than the remaining subsystem-driver combinations such that no two subsystem-driver combinations communicate with the same interface protocol;
a computing device communicatively coupled to the plurality of drivers and comprising:
an abstraction layer configured to convert incoming data in a given interface protocol from a given driver into a data packet having a Consultative Committee for Space Data Systems (CCSDS) protocol, wherein the incoming data has a source subsystem and has an intended destination;
a gateway configured to prevent passing of the data packet to the intended destination unless a data transmission route from the source subsystem to the intended destination matches one of a plurality of predefined routes that are listed in a route database;
a command arbitrator configured to prevent passing of the data packet to the intended destination unless the data packet is in an allowed format;
a guardian configured to prevent passing of the data packet to the intended destination unless content of the data packet conforms to guardian rules stored in an authorized content database;
a safety monitor configured to continuously assess a safety status of the unmanned autonomous device by verifying that a state of the unmanned autonomous device is below a predefined threshold, wherein the safety monitor is further configured to place the unmanned autonomous device in a minimal safe mode if one or more of the thermal state, the mission state, the attitude state, and the power state fall below respective predefined thresholds, and wherein the minimal safe mode comprises operating the unmanned autonomous device in a low power non-mission mode where attitude changes are restricted and where operation of the unmanned autonomous device is kept within a particular safe temperature range that is hotter than a minimum survival temperature and lower than a maximum survival temperature of the unmanned autonomous device; and
a state machine control mode arbitrator configured to receive the safety status from the safety monitor and further configured to alter, if the state is below the predefined threshold, one or more of the group consisting of the guardian rules and the predefined routes.

2. The unmanned autonomous device of claim 1, wherein the command arbitrator is further configured to verify the data packet's integrity by performing a checksum.

3. The unmanned autonomous device of claim 1, wherein the allowed format is a predefined length of the data packet.

4. The unmanned autonomous device of claim 1, wherein the allowed format is a predefined length of the data packet and a predefined data packet header structure.

5. The unmanned autonomous device of claim 4, wherein the safety monitor monitors a thermal state, a mission state, an attitude state, and a power state of the unmanned autonomous device.

6. The unmanned autonomous device of claim 1, wherein the unmanned autonomous device is a small satellite configured to be deployed in space.

7. The unmanned autonomous device of claim 1, wherein the unmanned autonomous device is selected from a group consisting of a small satellite, an unmanned aerial vehicle (UAV), and an unmanned underwater vehicle (UUV).

8. The unmanned autonomous device of claim 6, wherein the plurality of physical subsystems and the plurality of drivers comprise the following driver-subsystem combinations:
   a universal asynchronous receiver/transmitter (UART) driver communicatively coupled to an electric power subsystem using a UART protocol as an interface protocol;
   an inter-integrated circuit (I2C) driver communicatively coupled to an attitude determination and control subsystem using an I2C protocol as an interface protocol; and
   an Ethernet driver communicatively coupled to a guest payload subsystem using an Ethernet protocol as an interface protocol.

9. The unmanned autonomous device of claim 6, wherein the plurality of physical subsystems and the plurality of drivers comprise the following driver-subsystem combinations:
   a universal asynchronous receiver/transmitter (UART) driver communicatively coupled to an electric power subsystem using a UART protocol as an interface protocol;
   an inter-integrated circuit (I2C) driver communicatively coupled to an attitude determination and control subsystem using an I2C protocol as an interface protocol; and
   a Serial Peripheral Interface (SPI) driver communicatively coupled to a guest payload subsystem using an SPI protocol as an interface protocol.

10. The unmanned autonomous device of claim 6, wherein the plurality of physical subsystems comprises:
   an electric power system communicatively coupled to a universal asynchronous receiver/transmitter (UART) driver using a UART protocol as an interface protocol;
   an attitude determination and control subsystem communicatively coupled to an inter-integrated circuit (I2C) driver using an I2C protocol as an interface protocol;
   a first guest payload subsystem communicatively coupled to a Serial Peripheral Interface (SPI) driver using an SPI protocol as an interface protocol; and
   a second guest payload subsystem communicatively coupled to an Ethernet driver using an Ethernet protocol as an interface protocol.

* * * * *